United States Patent [19]

Rager

[11] 4,358,843

[45] Nov. 9, 1982

[54] SPINDLE FOR CENTERING A DATA DISK

[76] Inventor: Edgar A. Rager, 601 Almarida Dr., Apt. T6, Campbell, Calif. 95008

[21] Appl. No.: 192,068

[22] Filed: Sep. 29, 1980

[51] Int. Cl.³ .............................................. B23B 31/18
[52] U.S. Cl. ....................................... 369/261; 82/44; 279/1 L; 360/86; 369/270
[58] Field of Search ................... 82/44; 279/2 R, 1 L; 242/68.3; 360/86, 97, 98, 99, 135; 369/261, 270

[56] References Cited

U.S. PATENT DOCUMENTS

| | | | |
|---|---|---|---|
| 3,337,152 | 8/1967 | Knutson | 242/68.3 |
| 3,968,972 | 7/1976 | Morgan | 369/261 |
| 4,091,454 | 5/1978 | Kauffmann | 360/135 |
| 4,166,622 | 9/1969 | Rager | 274/1 R |
| 4,171,531 | 10/1979 | Grapes et al. | 360/99 |

*Primary Examiner*—Steven L. Stephan
*Attorney, Agent, or Firm*—Thomas Schneck

[57] ABSTRACT

A spindle construction for centering a disk hub in which the spindle includes a circumferential slot extending in the direction of the rotation axis of the shaft. The slot defines one or more fingers which compress inwardly when a hub is placed over the spindle. The outer peripheral shape of the finger generally matches the contour of the inside diameter of the disk.

12 Claims, 10 Drawing Figures

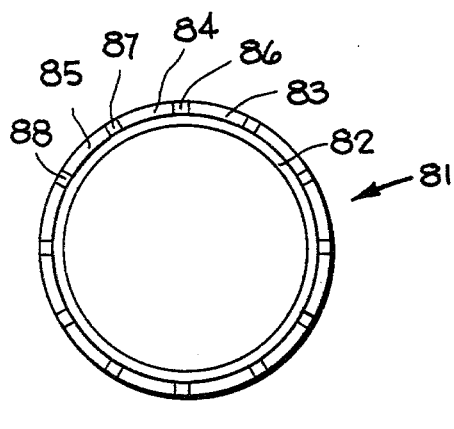
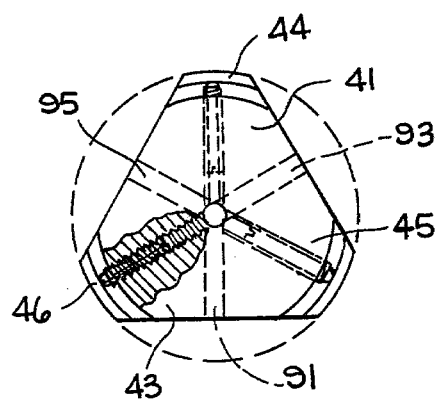
Fig.7  Fig.8
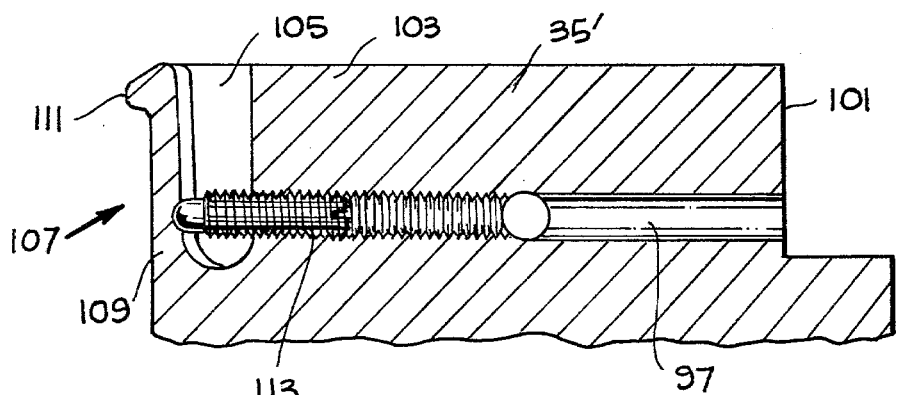
Fig.9
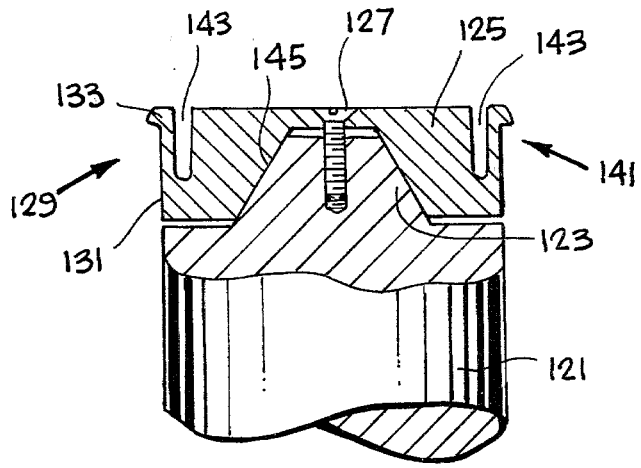
Fig.10

SPINDLE FOR CENTERING A DATA DISK

BACKGROUND OF THE INVENTION a. Field of the Invention.

The invention relates to apparatus used for centering rotating data storage media and more particularly, to a spindle for centering a disk hub on the spindle.

b. Prior Art.

Disk recording media are used in the computer industry for storage of large amounts of data. The recording media may contain millions of bytes of data which are accessible to the computer by means of a transducer or reading head which scans the data as it rotates at high speed relative to the recording head. The recording medium may be a ferromagnetic material having magnetic characteristics which make it suitable for reading or may have optical characteristics which make it suitable for reading, or may have still other characteristics. However, in most instances the medium itself is somewhat fragile and although it typically rotates at high speed, the medium itself is not attached to a spindle. Rather, the medium is mechanically attached to and supported by a hub which in turn is connected to a spindle or other spinner mechanism of a motor.

In U.S. Pat. No. 4,166,622 granted Sept. 4, 1979 E. Rager discloses a collar construction for a disk hub in which the interior of the collar is adapted with a plurality of cylinders having a peripheral shape mating with portions of the spindle to which the hub is fit. The cylinders have longitudinal slots extending partially therethrough allowing compression of the cylinders when in contact with a spindle. When the cylinders are pressed into the interior of the collar, the collar may be used for centering a disk on a spindle.

In U.S. Pat. No. 4,171,531 issued Oct. 16, 1979 R. Grapes and D. Watson disclose a centering device wherein a plurality of upstanding centering fingers are mounted in the spindle so that the fingers may engage a cone which enters the spindle, urging the cone toward a centered relation with the spindle. The cone serves to center a disk.

In U.S. Pat. No. 4,091,454 issued May 23, 1978 Kauffman teaches use of a spindle having outwardly facing fixed ribs. An eccentric multi-lobed triangular center is placed over the spindle with apexes of the triangle being placed over the ribs. The hub is then twisted with the ribs then centering the hub.

One class of hubs is adapted for mounting on a rotating spindle by means of a special collar in the interior of the hub for centering the hub with respect to a spindle which fits within the collar. The hub must be accurately centered because data reading and writing transducers rely on the concentricity of the data tracks. While adjustments of the transducers are made by servos, the data tracks are centered at the geometric center of a hub which should have its geometric center coincide with the geometric center of a spindle, usually driven by a motor.

In order to fit on a spindle, the inside diameter of a hub must be slightly greater than the outside diameter of a spindle. In order to make sure that the hub is centered on the spindle, a compression member is usually provided such that the compression member, when attached to the inside diameter of the hub actually causes the hub to have a smaller inside diameter than the outside diameter of the spindle. However, when the hub is placed over the spindle, the compression member compresses and the hub is thereby centered on the spindle.

A widely used prior art hub is illustrated in FIG. 1 of the drawings. A portion of an annular hub 11 is shown, having an annular collar 13 in its interior, for placement on a spindle. The geometric center of the collar coincides with the central geometric axis, A, of hub 11 and a spindle on which the hub is placed. Collar 13 is usually machined out of metal and is tightly pressed into place in the center of a hub.

The collar 13 has an inside surface 15 and an outside surface 17. The inside and outside surfaces are in fact walls separated by a circular groove 16, which extends part of the way from the top to the bottom of the collar. The bottom of the collar supports the inner and outer walls. The inside surface 15 is interrupted at intervals by short wall portions 19, 21, 23 which project inwardly more than the remainder of the inside wall. The wall portions 19, 21, 23 form fingers which compressibly contact the exterior of a spindle for accurate centering of a hub on the spindle. It should be noted that the fingers do not transfer mechanical energy to or from the hub for spinning. Such energy is transferred by other means, such as by lugs or bolts which do not influence alignment of the hub with respect to the spindle.

With reference to FIG. 2, the manner of using the prior art collar of FIG. 1 is illustrated. The collar 13 within hub 11 is turned upside down relative to FIG. 1 and the hub 11 is placed over the spindle 25. The spindle has a cantilever section 27 with a support rim 29 with which the hub 11 makes contact by means of pads 31 and 33. Bolts may also extend into rim 29 between the pads 31 and 33 for mechanically securing the hub 11 to spindle 25, so that rotary motion from the spindle can be transferred to the hub. It may be seen that the top of the spindle tapers inwardly and that the only contact made between the center shaft of the spindle and the hub is made with the centering collar 13.

However, as can be seen from FIG. 1 it is quite difficult to manufacture the collar shown. The inside wall has different circular diameters. The first and greatest diameter is formed by the main portion of the inside surface 15 of the wall, while other, lesser diameters are defined by the portion of fingers 19, 21, 23 facing the axis of rotation. The upper portion of each of the fingers 19, 21, 23 has a diameter approximately one or two thousandths of an inch less than the lower portion thereof, which in turn has a diameter approximately twenty thousandths of an inch less than the main wall portion of inside surface 15. The construction of the collar 13 requires intricate machining, such that most of the cost of the hub is represented by the collar 13.

An object of the invention is to devise a simplified construction for centering a disk hub on a spindle which is characterized by lower cost compared to prior art collar and spindle constructions.

SUMMARY OF THE INVENTION

The above object has been achieved by providing a new spindle which provides a centering device for a disk hub. This is in contrast to many prior art devices wherein the centering mechanism was associated with the hub. The spindle is characterized by a shaft having a free end in which a peripheral slot is cut in a centering member which is either a unitary portion of the spindle or connected to the spindle. The slot has a U-shaped cross section with the indentation of the U-shape parallel to the length of the shaft axis. The slot defines at least one upright finger with a radially outwardly facing peripheral surface having a face portion and a contact tip portion, the tip portion extending radially outwardly further than the face portion. A hub placed over the spindle will contact the tip portion causing the finger to be compressed slightly inwardly, thereby centering the hub on the shaft axis and hence the spindle. The spindle may have a triangular cross section with rounded apexes shaped to match the contour of a disk hub to be placed over the spindle. Only one of the apexes need have the previously mentioned peripheral slot. When a hub is placed over the spindle, the finger compresses inwardly, centering the hub on the spindle. Other cross sectional shapes, including a circular shape, may also be used.

BRIEF DESCRIPTION OF THE DRAWINGS

FIG. 7 is a top plan view of an alternate centering device of the present invention.

FIG. 8 is a top, partial cutaway view, of another alternate centering device of the present invention.

FIG. 9 is a partial side sectional detail of the device of FIG. 8.

FIG. 10 is a side plan view of a spindle with an alternate centering device of the present invention connected thereto.

DESCRIPTION OF THE PREFERRED EMBODIMENT

Figure 1:
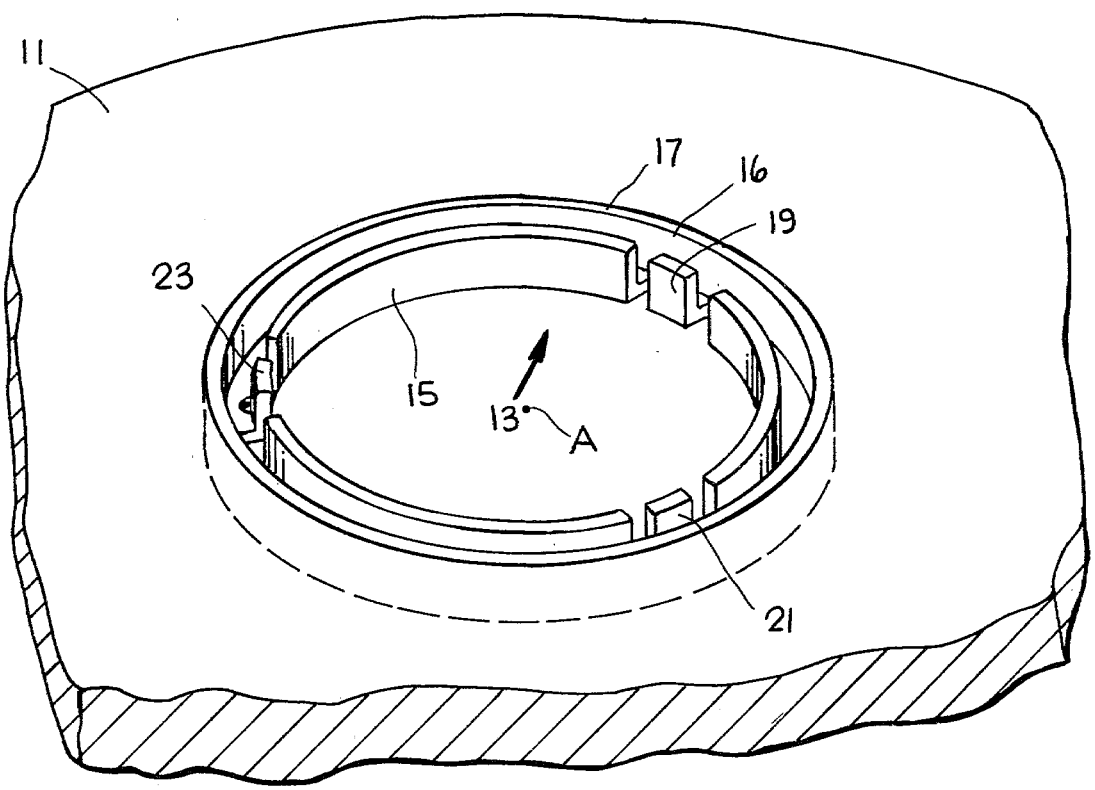
FIG. 1 is a perspective view of a portion of a prior art hub having a compression collar for centering the hub on a spindle.
Figure 2:
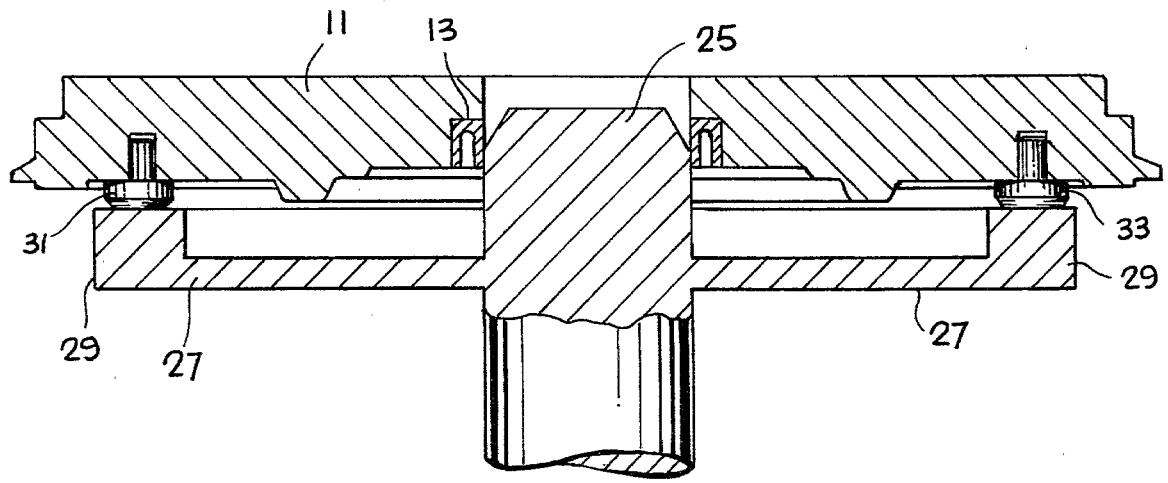
FIG. 2 is a side cutaway view showing the prior art hub of FIG. 1 mounted on a prior art spindle.
Figure 3:
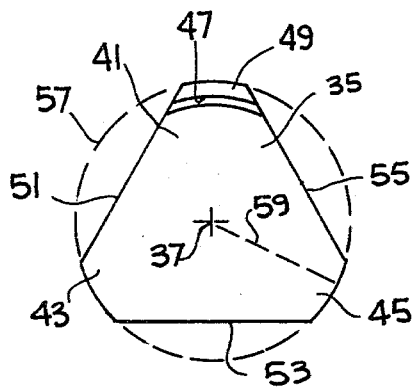
FIG. 3 is a top plan view of a centering device of the present invention.

With reference to FIG. 3, the upper portion of a spindle is shown. This upper portion comprises a shaft 35 having an axis 37. The view is a top view looking down at the free end of the shaft, with the opposite end of the shaft being the driven end. The upward end of the shaft is triangular, having the triangular apexes 41, 43 and 45.

Apex 41 has a U-shaped slot extending therethrough with the line 47 indicating the bottom of the slot. The slot defines an upright finger 49 which is a radially compressive member.

It may be seen that the spindle 35 is triangular, with sides 51, 53 and 55 of generally equal length. The spindle need not be triangular. In general, a polygonal cross section for the shaft or a circular or near circular cross section will allow a hub to be placed over the shaft. A triangular cross section is preferred because the minimum number of points to secure a hub to a shaft is three. With two rigid triangular apexes and one compressible apex, the inside diameter of a hub, indicated by the circular dashed line 57 may be made a few thousandths smaller than shaft radius 59, so that the shaft will nest in a circular aperture in the center of a hub. A typical diameter of the shaft is 1.750 inches and the extent of compression is less than the width of the slot which is 0.125 inches.

Figure 4:
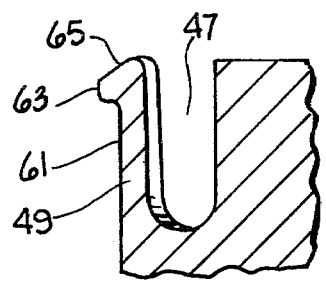
FIG. 4 is a partial side sectional detail of the device of FIG. 3.

With reference to FIG. 4, a vertical section may be seen illustrating the slot 47 and finger 49. The typical vertical extent of finger 49 from the bottom of slot 47 to the top of the finger is approximately 0.290 inches, while the radical thickness of the finger is 0.060 inches. The finger 49 may be seen to have a lower face portion 61 which faces radially outwardly and an adjacent tip portion 63 with the tip portion extending radially outwardly further than the face portion of the finger. It will be seen that the tip portion has an upper beveled edge 65 permitting a disk hub to wedge finger 49 inwardly until the tip portion 63 makes contact with the inside diameter of the hub.

Figure 5:
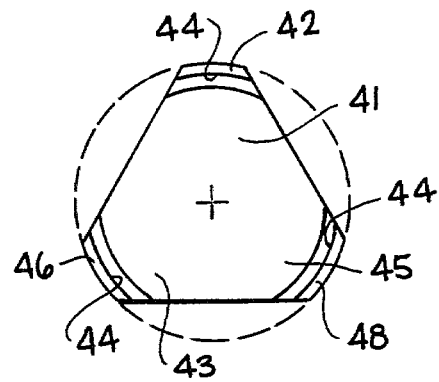
FIG. 5 is a top view of an alternate version of the centering device of the present invention.

With reference to FIG. 5, an alternate construction of the spindle of FIG. 3 may be seen. In that figure, a slot 44, similar to slot 47 has been provided in apexes 41, 43 and 45. The slot 44 defines fingers 42, 46 and 48 identical to finger 49 illustrated in FIG. 4. FIG. 5 illustrates that a polygonal spindle may have multiple compression members.

In order to manufacture the spindles of FIGS. 3 and 5 the spindle is first ground to the approximate polygonal shape. Next, the polygonal corners are milled to the desired shape and the slots are cut in each apex. Next the spindle is heat treated for hardening. Lastly, the final grinding of the fingers is accomplished. During this grinding an annular collar is placed around the spindle, the collar having radially inwardly moving screws at positions corresponding to each finger which is compressible. The set screws are screwed inwardly so that the fingers are under compression during grinding by perhaps a few thousands of an inch. After grinding the finger profile shown in FIG. 4, the screws are unscrewed, allowing the fingers to project radially outwardly further than the rigid polygonal apexes. The curvature of the face portion of each apex is circumferentially curved with the curvature of each face being an arc which generally matches the inside diameter of a hardened annular member in the central aperture of a disk hub which is placed over the spindle.

Figure 6:
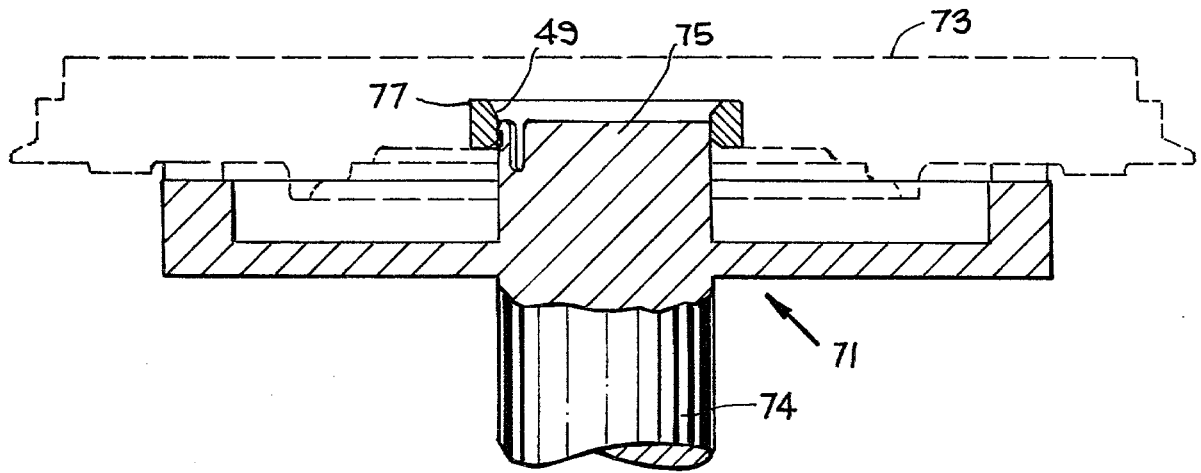
FIG. 6 is a side sectional view of the device of FIG. 3 with a hub mounted thereon.

FIG. 6 shows a spindle 71 of the present invention for supporting a disk hub 73. The spindle may be seen to have a lower portion 74 which is connected to a motor or other spinner mechanism and an upper portion 75 which has the triangular cross section of FIG. 3. In particular, the finger 49 may be seen to make contact with a hardened annular member 77 mounted within the hub 73. When the hub 73 is placed over top portion 75 of the spindle, finger 49 is compressed slightly inwardly while two other triangular apexes make firm contact with the member 77. The compression of finger 49 assures snug contact with member 77, centering the hub 73 on spindle 75. As in the prior art, the support rim 29 provides mechanical support to the hub 73 and limits the downward extent of travel of the hub after placement over the spindle. The support rim also provides for transfer of mechanical energy from the spindle 71 to the hub.

In FIG. 7, a top view of a spindle 81 is shown, having a central axis 80. The top of the spindle has an annular groove 82 near the outer circumferential edge of the spindle. The groove 82 resembles groove 47 in FIG. 4. The uppermost portion of the outer peripheral wall of spindle 81 consists of wall segments 83, 84, 85 and so on, separated by wall gaps 86, 87, 88, and so on. The wall segments 83, 84 and 85 have shapes similar to the vertical finger 49 illustrated in FIG. 4. There is an upwardly extending finger which has a lower face portion of a lesser diameter, compared to an upward tip portion which extends radially outwardly further than the face portion by a few thousandths of an inch, depending on thickness of the material, the depth and width of the groove and the material from which the centering device of the present invention is made. Normally, the material in this and the other embodiments should be a heat treatable alloy steel.

The number of fingers disposed about the circumferential periphery of spindle 81 is preferably a multiple of three. Generally speaking, multiples of two are not preferred, although they are operable. Multiples of three are preferred because any unidirectional force will tend to be distributed among the fingers.

With reference to FIG. 8, a modified construction of the centering device of FIG. 5 is shown. In FIG. 8, each apex 41, 43 and 45 has a bore extending into the apex from the opposite side thereof. For example, the bore 91 is drilled through the spindle toward apex 41. Similarly, bore 93 extends toward apex 43 and bore 95 approaches apex 45. The purpose of each bore is to seat a screw which may be advanced to push upon a finger as the tip of each finger begins to wear down. Further, in the event that a centering portion of a spindle is slightly undersized, the centering member may be adjusted to provide the desired amount of radial expansion to make contact with a hub placed over the spindle.

FIG. 9 illustrates the manner in which a screw can be used to assist outward expansion of a finger. The bore 97 penetrates a spindle 35' from the truncated spindle portion 101 which forms the base opposite a triangular apex 103. A groove 105 is machined into the spindle, defining the upright finger 107 with the face portion 109 and a tip portion 111 intended to make contact with a hub.

The bore 97 is threaded near apex 103 and a screw 113 is seated in the threads. As tip portion 111 wears down, screw 113 may be advanced slightly so that the tip 111 will still exert a centering influence on a hub.

With reference to FIG. 10, a portion 121 of the free end of a spindle is shown. The uppermost portion of the spindle terminates in a protrusion 123, which is preferably axially symmetric. Alternatively, an indentation can be used. The purpose of the protrusion or indentation is to provide an interlocking fit for a centering member 125 which is attached as an extension to the free end of the spindle by means of a screw 127, or similar fastener. The centering device 125 has at least one upright finger 129 with a face portion 131 and a tip portion 133 which extends radially outwardly further than the face portion 131. Preferably, more than one finger can be provided, such as the additional finger 141, which is a second of three, six, nine or any multiple of three, as previously described. The centering device 125 has an interrupted circumferential slot 143, similar to slot 44 in FIG. 5, with a U-shaped cross section. The centering device 125 may be similar, if not identical, in construction to the upper portion of the spindle illustrated in FIG. 5, except that the centering device 125 is removable from the spindle. The advantage of a centering device as shown in FIG. 10 is that it may be removed from a spindle when the outwardly extending tips become worn. In this manner, the same spindle may continue to be used without replacement. Moreover, the adjustable screw mechanism illustrated in FIG. 8 may not be needed, although it still may be used for adjustment purposes if desired. It is important that the bottom wall 145 of the centering device have a shape which interlocks snugly with the upper surface of the free end of spindle 121.

Once a hub is placed over the centering device or centering spindle of the present invention, the hub is automatically centered and is then bolted or otherwise fastened or held in position with respect to the hub spinner mechanism or motor by other mechanical means, which by itself would not automatically provide centering. For example, bolts extending through holes in the hub would not automatically provide precision centering. However, using one of the centering spindles or centering devices of the present invention will provide precision centering so that subsequent mechanical attachment by bolts will provide data tracks which are centered at the geometric center of the hub and spindle.

What is claimed is:

1. A spindle for centering and driving a disk hub comprising,
a spindle having a lengthwise axis with an upward free end over which a disk hub is placed, the free end having an interrupted peripheral slot with a U-shaped cross section, the open end of the U facing upwardly, and the slot defining at least one upright finger from the base of the U extending upwardly, the base of the U fixed integrally with the spindle, said finger having a radially outwardly facing peripheral surface with a face portion at the upper tip of the finger extending radially outwardly further than the base toward the inside diameter of a disk hub, whereby said finger will be compressed inwardly by the face portion contacting the hub, centering the hub on the spindle.

2. The spindle of claim 1 wherein the cross sectional shape of said spindle is generally triangular, having triangular apexes shaped to match the contour of a disk hub to be placed over the spindle.

3. The spindle of claim 2 wherein said triangular spindle has one upright finger.

4. The spindle of claim 2 wherein said triangular spindle has more than one upright finger.

5. The spindle of claim 3 or 4 wherein said triangular spindle has three apexes having arc shaped outer peripheral surfaces, with the curvature of each arc being equal, whereby a disk hub placed over the tip portion of said finger causes compression of said finger.

6. The spindle of claim 1 wherein the cross sectional shape of said spindle is polygonal, with the number of polygonal sides equal to a multiple of three.

7. The spindle of claim 1 wherein the cross sectional shape of said spindle is generally circular.

8. The spindle of claim 1 wherein said shaft has a number of bores extending therethrough transverse to the shaft axis and communicating with a finger, the interior of said slot having threads therein for accommodating a screw which may be advanced into contact with said upright finger whereby said screw can adjust the radial position of said finger to maintain a tight fit between said spindle and a hub.

9. A centering device for centering a disk hub about a spindle comprising, a spindle extension member having mounting means for connection to the free end of a spindle about which a disk hub is to be mounted, the extension member having an interrupted circumferential slot with a U-shaped cross section, the open end of the U facing upwardly, and the slot defining at least one upright finger from the base of the U extending upwardly, the base of the U fixed integrally with the spindle extension member, said finger having a radially outwardly facing peripheral surface with a face portion at the upper tip of the finger extending radially outwardly further than the base for snug contact with the inside diameter of a disk hub, whereby said finger will be compressed radially inwardly by the face portion contacting the hub, centering the hub on the spindle.

10. A centering spindle for centering a disk hub comprising, a spindle made of a stiff material having an axis of rotation with a lower driven end for connection to a motor and an upward free end over which an annular disk hub is placed, with the inside diameter of the hub snugly fitting over the spindle, the free end of the spindle having a triangular cross section, with triangular apexes having face portions extending radially outwardly further than the spindle lower end and integral with the spindle, and shaped to nest in snug contact with the inside diameter of a disk hub, said triangular cross section having generally equal triangular sides, at least one of said face portions having means for radially compressing so that said hub is centered on said spindle.

11. The centering spindle of claim 10 wherein said means for radially compressing comprises a circumferential slot near at least one triangular apex defining an upright finger, said finger having a radially outwardly facing peripheral surface being urged toward the inside diameter of a disk hub.

12. The spindle of claim 11 wherein said finger is further defined by a tip portion adjacent to said face portion, the tip portion projecting radially outwardly further than the face portion.

* * * * *